Sept. 10, 1963  C. O. LASSY  3,103,353
GANG FIXTURE
Filed April 8, 1960  3 Sheets-Sheet 3

Carl O. Lassy
INVENTOR.

United States Patent Office 3,103,353
Patented Sept. 10, 1963

3,103,353
GANG FIXTURE
Carl O. Lassy, 96 Bohemia St., Plainville, Conn.
Filed Apr. 8, 1960, Ser. No. 20,882
8 Claims. (Cl. 269—267)

The present invention generally relates to a work holder and more particularly to a gang fixture with a novel and improved compensating jaw assembly and novel side locking device for securely holding a plurality of workpieces when said workpieces are engaged by a tool and represents certain improvements in the device disclosed in copending application Serial No. 720,597, filed March 11, 1958.

The primary object of the present invention is to provide a gang fixture for holding a plurality of workpieces having a novel compensating jaw construction which will securely and positively hold various sizes of workpieces.

Another object of the present invention is to provide a gang fixture including novel compensating jaws in accordance with the preceding object together with a novel side locking feature for retaining a plurality of workpieces in rigid clamping engagement from the sides as well as from the surfaces engaged by the compensating jaws.

A further object of the present invention is to provide a workpiece holder incorporating in its construction a novel compensating jaw arrangement with the compensating jaws being removable for repair or replacement with the compensating jaws adapted to engage a plurality of workpieces with even pressure being exerted on each of the workpieces engaged by the compensating jaws irrespective of the size and shape of the workpieces.

Another important feature of the present invention is to provide a gang fixture in accordance with the preceding objects which is simple in construction, easy to use, effective in its clamping operation, easy to repair and maintain and generally inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is a perspective view illustrating a pair of movable jaws;

FIGURE 6 is a perspective view illustrating a single movable jaw;

FIGURE 7 is a perspective view of a modified work jaw; and

FIGURE 8 is a perspective view of another form of work jaw.

Figure 1:
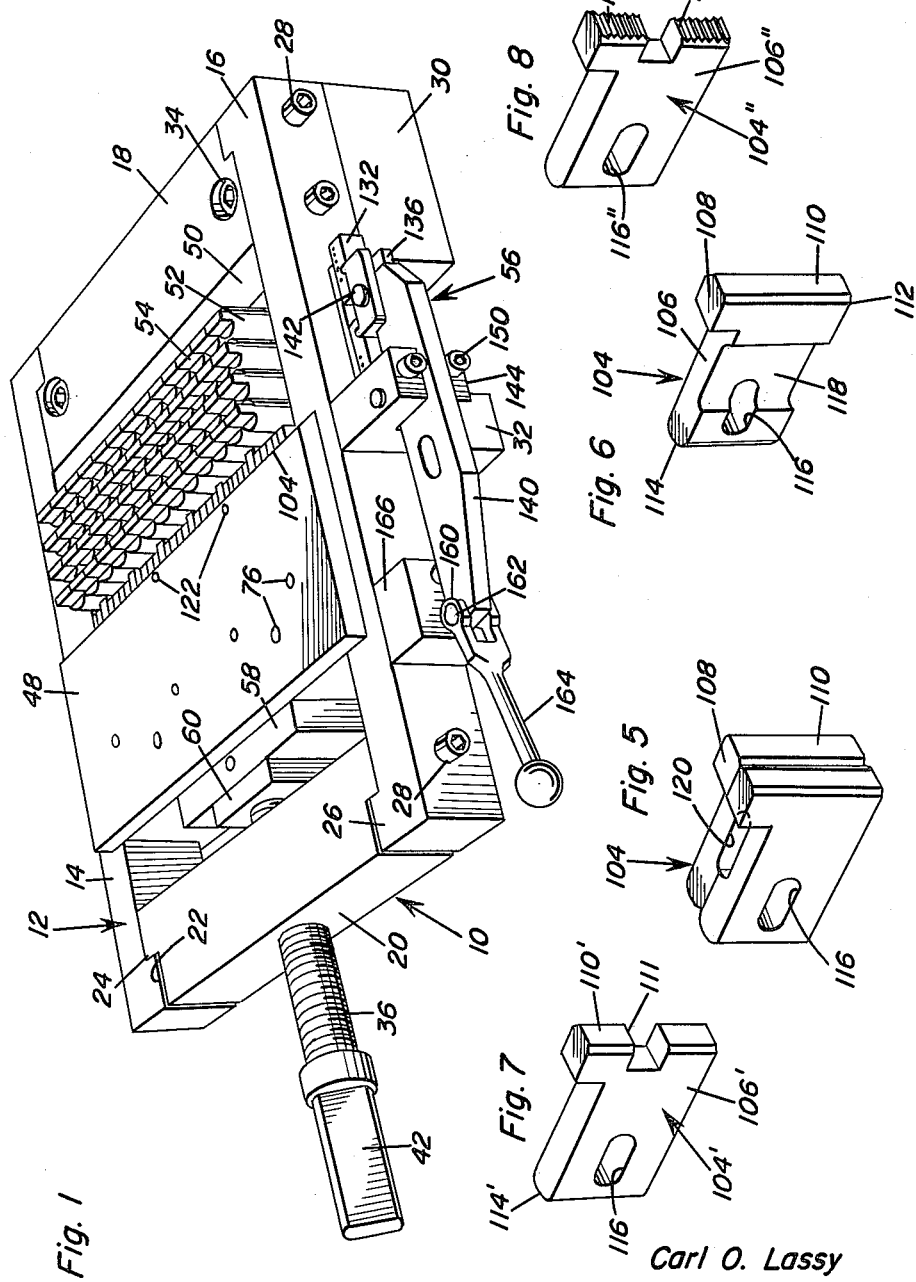
FIGURE 1 is a perspective view of the gang fixture of the present invention.

Referring now specifically to the drawings, the numeral 10 generally designates the gang fixture of the present invention which includes a generally open framework designated generally by the numeral 12 and which includes parallel side members or rails 14 and 16 and transverse end members or rails 18 and 20. Each of the end members 18 and 20 is provided with a recess 22 in the end edges thereof communicating with the ends of the framework 12 and defining a shoulder 24 for abutment by an inwardly extending projection 26 on the side members 14 and 16 thereby forming a rigid framework. The side members 14 and 16 are secured to the end members 18 and 20 by fastening bolts 28 which serve to retain the inward extension 26 in engagement with the abutment 24 thereby preventing outward movement of the end members 18 and 20. The framework 12 is provided with supporting blocks 30 and 32 for engaging a supporting surface or the bed or table of a machine tool or the like and the supporting blocks are retained in position by fastening bolts 34.

Extending through the end member 20 is an elongated externally threaded rod or shaft 36 received in an internally threaded bore 38 in the end member 20. The outer end of the rod 36 is provided with a collar 40 and an axially extending polygonal portion 42 for receiving a rotating tool such as a crank, wrench or the like for rotating the screw threaded rod 36 for moving the same inwardly and outwardly in relation to the framework 12.

Figure 2:
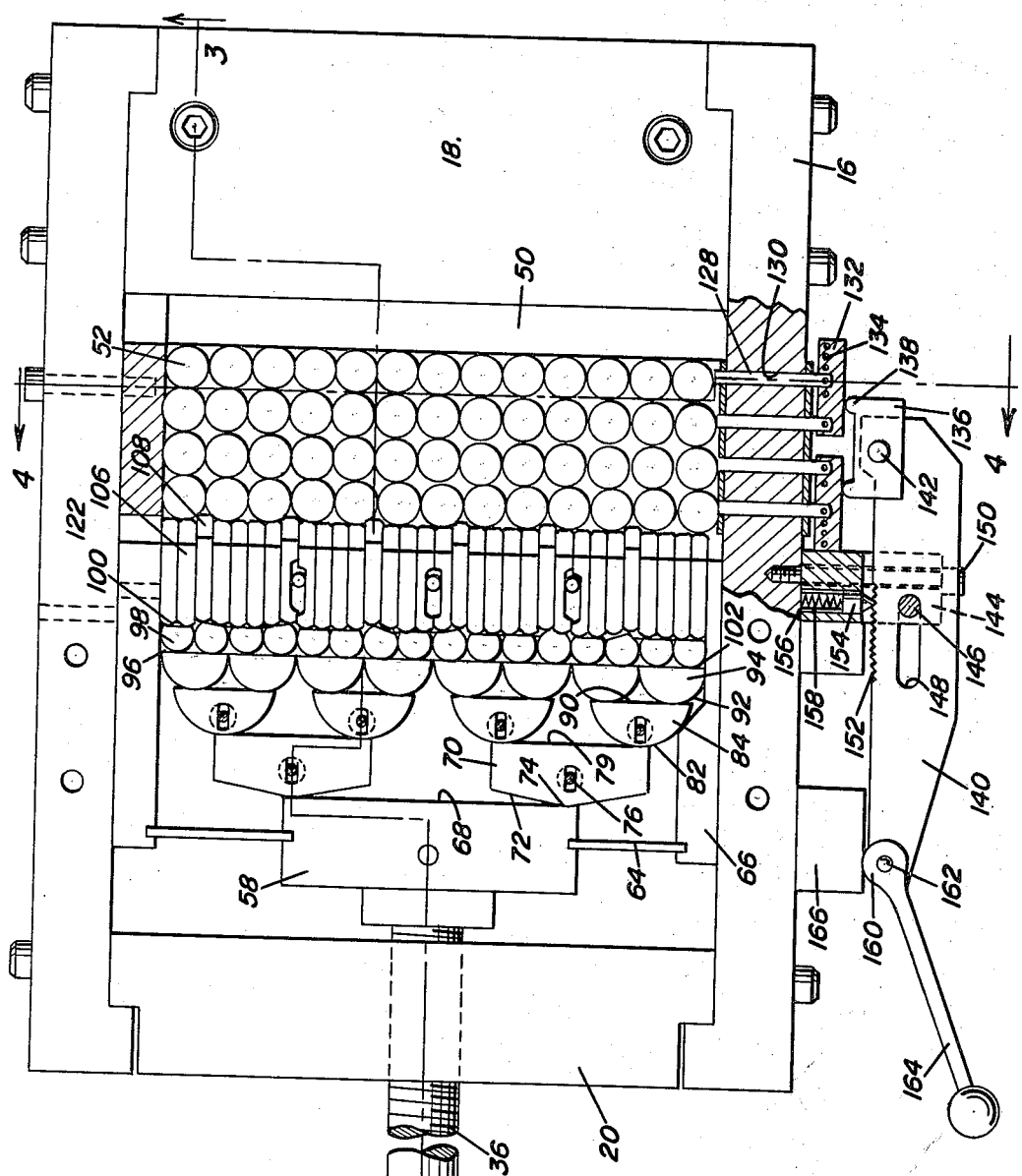
FIGURE 2 is a plan vew of the construction of FIGURE 1 with the top plate removed illustrating the structure of the compensating jaw assembly and portions of the frame being broken away for illustrating the details of construction of the side clamp or locking device.

Attached to the inner end of the screw threaded rod 36 is a jaw assembly generally designated by the numeral 44 which includes a lower plate or bottom plate 46, a top plate 48 both of which extend partially over the upper and lower surfaces of the side rails 14 and 16 for guiding the movement of the jaw assembly 44 in relation to a stationary jaw 50 mounted against the inner surface of the end member 18 for retaining a plurality of cylindrical workpieces 52 clamped therebetween so that the workpieces may be notched, slotted or otherwise machined or the like. For example, the cylindrical workpieces 52 may be provided with notches or cut-outs 54 across opposed surfaces of the end thereof thereby defining a cylindrical workpiece having an axially extending transverse lug. For cooperating with the jaw assembly 44, there is also a side locking device generally designated by the numeral 56 which retains the workpieces 52 from shifting laterally and retaining the workpieces in aligned relation as indicated in FIGURE 2.

The jaw assembly 44 includes a transverse block 58 having a centrally disposed projection 60 having a socket 62 rotatably connected to the grooved inner end of the threaded rod 36 whereby the block 58 will be moved inwardly and outwardly with the inner end of the threaded rod 36. Extending laterally outwardly from the side edges of the blocks 48 is a pair of plates 64 connected to side rails 66 which engage the inner surface of the side members 14 and 16. The inner surface of the block 58 is flat as indicated by the numeral 68 and engages a pair of bridging members 70 having inclined surfaces 72 and an apex 74 for engagement with the surface 68. The bridging elements 70 are freely rotatable and slidable on a pin or fastener 76 which extends through a slot-like opening 78 in the bridging member 70 and which is threaded into the lower plate 46 and countersunk into the upper plate 48. The inner surface of the bridging member 70 is provided with a flat surface 80 which engages the cylindrical surface 82 of a pair of generally semi-circular compensating members designated by the reference numeral 84. The compensating members 84 are pivotally mounted on fasteners 86 received in slot-like openings 88 in the members 84. The fasteners 86 are screw threaded into the lower plate 46 and countersunk in the top plate 48 thus enabling pivotal movement of the members 84 about the pin 86 and also limited body movement of the members 84.

Each of the semi-circular members 84 is provided with a flat inner surface 90 which bridges and engages the cylindrical portion 92 of a pair of semi-cylindrical members 94. The semi-cylindrical members 94 extend between the plates 46 and 48 and are movable in relation thereto but are not directly connected thereto whereas the members 84 are movable and pivotal in relation thereto and the members 70 are also movable and pivotal in relation thereto with the respective fasteners 76 and 86 retaining the members movable between the plates.

The semi-cylindrical members 94 are each provided with a flat surface 96 engaging a pair of partial cylindrical members 98 which are greater than one-half of a cylinder and substantially extend through three-quarters of a cylinder with each member 98 having a flat surface 100 facing away from the cylindrical surface 102 which is in engagement with the flat surface 96 on the members 94. The members 98 are freely movable between the plates 46 and 48 in the same manner as are the members 94. The members 84, 94 and 98 decrease in diameter and increase from one-half of a cylinder or slightly less in members 84, slightly more than one-half of a cylinder in members 94 and a major portion of a cylinder in members 98. The various partially cylindrical members transmit compressive force and may be considered rollers or partial rollers.

Disposed between the plates 46 and 48 is a plurality of compensating work jaws generally designated by the numeral 104 shown in detail in FIGURE 6 which is generally a rectangular member 106 having an elongated clamp face 108 at one end provided with a flat vertical portion 110 and angulated corner portions 112. The rear or inner end edge 114 of each jaw 104 is provided with a radius as shown in FIGURES 5–8. Each jaw 104 is provided with a longitudinal slot 116 therethrough and the central portion of certain of the jaws 104 is provided with a longitudinally extending vertical recess 118 therein. The jaws 104 with the recesses 118 are arranged in pairs as indicated in FIGURE 5 with the recesses 118 facing inwardly and forming in actuality a slot 120 for receiving a retaining rivet or screw 122 in the slot 120 which retains the upper and lower plates in position. The rivets or screws are placed approximately every eight jaws which would be a total of 3 rivets in a 32 jaw fixture but, of course, this could be varied. A transverse rod or bolt 124 extends through the aligned slots 116 thereby preventing the compensating jaws 104 from being forced out from between the plates 46 and 48 when the fixture is greased. The lower plate 46 is provided with a grease fitting 126 by virtue of which the entire interior of the jaw assembly may be filled with lubricant for retaining the movable components in well lubricated relation and also for preventing entry of foreign material into the jaw assembly.

Figure 3:
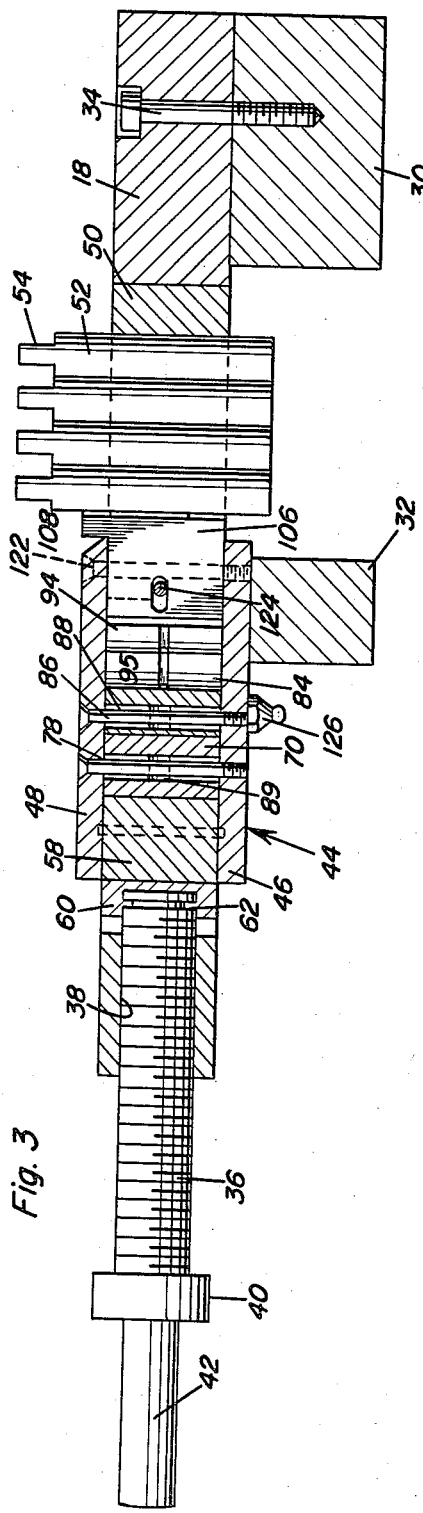
FIGURE 3 is a longitudinal, sectional view taken substantially upon a plane passing along section line 3—3 of FIGURE 2 illustrating the details of construction of the gang fixture.
Figure 4:
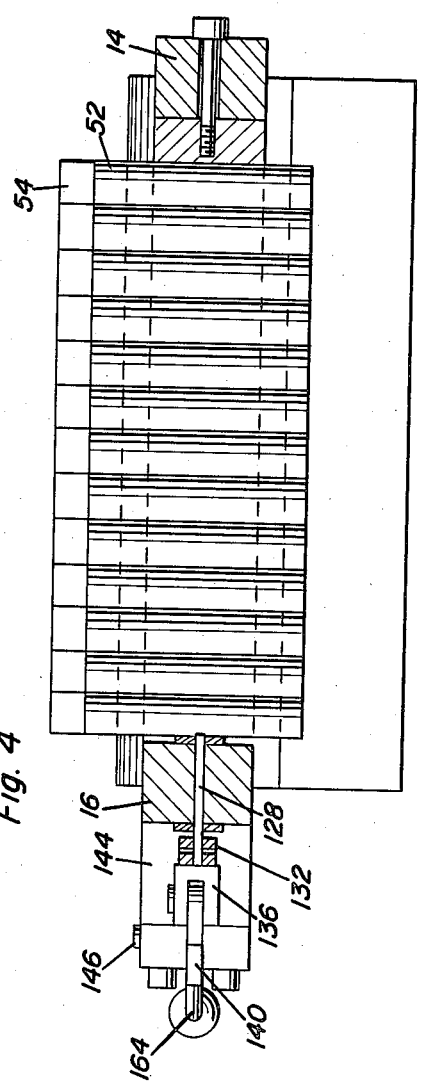
FIGURE 4 is a transverse, sectional view taken substantially upon a plane passing along section line 4—4 of FIGURE 2 illustrating further structural details of the gang fixture.

The compensating work jaws may be made in varying lengths, and may be provided with various configurations on the gripping end thereof for use in conjunction with various shapes and sizes of work. For example, FIGURE 7 illustrates a jaw with a recess or notch 111 therein for receiving shoulder work. As illustrated in FIGURE 7, the gripping surface of the jaw may be serrated as indicated by the numeral 115 and provided also with a notch 113. In addition, the jaws may be provided with a tapered gripping surface for gripping and holding tapered work and they may also be either straight or with a step. When the jaws are made with a step, the top of the jaw is flush with the top of the top plate as illustrated in FIGURE 3 of the drawings.

This invention incorporates a universal compensating jaw assembly fixture having a large number of relatively narrow compensating work jaws that will exert even pressure on a large number of workpieces even though the workpieces vary in size, shape, diameter or the like and firmly and securely grip these workpieces. By virtue of the particular construction of the invention, tremendous pressures can be exerted as needed for holding the workpieces securely in position such as is necessary when heavy milling cuts are performed for fast removal of a large amount of material from the workpiece.

The holding force is limited only by the amount of pressure that could be withstood by the workpiece and by the amount of pressure that the locking means employed will exert since there are no weak points such as screws, pins or the like which transmit the holding force. Rather, as can be clearly seen, all of the force or holding pressure is directed and transmitted through a series of compensating jaws that bear directly upon each other.

The compensating work jaws can readily be removed from the fixture and replaced with other compensating work jaws that can be made, at a relatively low cost and at an expenditure of a relatively short time, be made for special shapes, tapered workpieces, shouldered pieces, thin wall work and the like and these jaws are quickly and easily removed on the job while the fixture is still mounted right on the machine where it is being used. This will save considerable time both as to the operation of the machine since it will mean less down time for the machine and will also save the time of the setup man as ordinarily, the change-over from one holding fixture to another requires the expenditure of considerable time. The compensating jaws have the inherent strength to withstand great pressure without danger of breaking and will withstand long hard usage without effecting the accuracy and usefulness of the fixture and generally are simple and economical to manufacture in a very precise and accurate manner from standard stock sizes with very little machining or waste. This fact has a greater advantage since it maintains a low cost in producing the tool.

The present fixture also requires a minimum of rivets or screws since the compensating jaws are simply housed in place, free to move and compensate for variations in work size or shapes and yet, at the same time, are held in prearranged patterns. Also, as shown by the drawings, it is possible to put screws or rivets close to the edge of the compensating jaw plates preventing these plates from springing apart thereby ensuring a permanent and accurate housing for the compensating jaws which in turn ensures a true and accurate holding of the workpieces even when the workpieces are relatively short and are contacted and held by only the upper portion of the compensating work jaws. Also, it is very practical and possible to manufacture the compensating jaws in large quantities and use them in various size fixtures or vises due to the fact that the greater part of these compensating jaws are not housed one into another nor are they held in a fixed position with pins. Thus, the compensating jaws may be arranged in larger or smaller patterns.

There is also made a provision for attaching a work gauge support to the side rails which can be formed to the finished shape of the work piece that is being milled or ground thereby giving maximum support to the work as in the case when very short workpieces are being machined with little surfaces of the workpieces being held in a fixture or where a deep cut is milled into a workpiece extending high above the fixture, the extra support that this work gauge support gives is required to allow maximum feed of the machine tool thus cutting down in the time required for the operation. The fixture permits the entire working mechanism to be easily sealed at a relatively low cost with provision being made for pumping the fixture full of grease that automatically and efficiently keeps out foreign matter or moisture that would otherwise tend to rust the mechanism which would ruin the precise accuracy demanded in a tool of this type.

As illustrated in FIGURE 2, the compensating jaws 104 and the particular construction of the members 58, 70, 84, 94 and 98 all cooperate to balance and retain the pressure exerted on the plurality of workpieces equal for securely retaining all of the work pieces with an equal degree of rigidity.

The side locking mechanism generally designated by the numeral 56 for retaining the workpieces 52 in alignment is illustrated most specially in FIGURE 2 and includes a plurality of pins 128 extending through bores 130 in the side member 16 with the pins 128 being spaced from each other for engagement with the center portion of the outermost workpiece 52 in each row of workpieces. The pins 128 are arranged in pairs and are attached to bridging blocks 132 having a plurality of spaced apertures 134 therein for attachment to the ends of the pins 128. Engaging the members 132 in a pressure member 136 having rounded pressure members or pressure feet 138 engaging the outer surface of the blocks 132. By varying the connection points between the pins 128 and the blocks 132, the pressure on the pins 128 may be generally equalized or may be increased on certain of the pins and decreased on certain others. The pressure block 136 is pivotally mounted on an elongated operating lever 140 by virtue of a pivot pin 142. The operating lever or handle 140 is pivoted between two mounting brackets 144 by virtue of a pivot bolt 146 that is received in a slot 148 in the member 140 for varying the position of the pressure block 136 in relation to the blocks 132. The brackets 144 actually are the legs of a U-shaped bracket that is attached to the side member 16 by a pair of bolts 150. The inner surface of the member 140 is provided with serrations 152 for engagement with a pointed plunger 154 disposed in a socket 156 and urged outwardly thereof by a spring 158 thereby frictionally retaining the operating member 140 in adjusted position with it being necessary to overcome the resistance to movement afforded by the plunger and the spring when moving the operating handle or member longitudinally in relation to the framework.

For exerting locking pressure on the pins 128, there is provided a cam 160 mounted on the end of the member 140 remote from the pressure block 136 by virtue of a pivot pin 162. The cam 160 is provided with an elongated handle 164 for operation thereof and the cam surface of the cam 160 engages a block 166 attached to the side frame member 16 in any suitable manner whereby rotation of the cam will cause the end of the member 140 engaged therewith to move outwardly thereby moving the pressure block 136 inwardly and exerting continuous balance pressure on the pins 138 for retaining the workpieces 52 in alignment as illustrated in FIGURE 2.

The side locking device provides for locking of one or a series of rows of workpieces which also forcibly locate the workpieces in a firm and accurate manner against a work block with the entire assembly being quickly adjusted for various thicknesses and widths of either round or flat workpieces. The side locking device is cam actuated which renders the actuation thereof extremely fast.

The movement of the compensating work jaws is automatically limited by the movement of the compensating members or rollers due to the change of leverage which occurs as the compensating jaw or rollers are revolved. It will be seen that the pressure line of force is directed in almost a straight line to the compensating work jaw 104 which jaw 104 is furthest back in the fixture and the pressure line of force is transmitted to the outside edge of the compensating work jaw 104 which extends out of the fixture to the point that the compensating jaws or rollers will only revolve up to a certain position, due to the leverage factor and position that the compensating jaws or rollers assume. The predetermined raise on the end of the compensating work jaws 104 determines the amount of movement thereof. The compensating work jaws have a slot of suitable length to permit movement of the compensating work jaws so that the natural movement of compensating work jaw is not hindered thereby enabling a rod to maintain the jaws in the fixture but not to control movement of the work jaws.

The compensating jaws and the rollers or partial cylindrical members engaged therewith provide a construction wherein the position to which these members are pushed will be retained by these members until they are pushed into another position. For example if an irregularly shaped article is to be clamped, it is only necessary to move the compensating jaw assembly into engagement with the member to be clamped wherein the movable jaws will conform to the member in such a manner that an equal pressure will be exerted on the member over a large portion of its periphery.

It is noted that the elements 84 and 94 are provided with grooves 95 in the peripheral cylindrical surfaces thereof for better circulation of lubricant around the surfaces. Also, the bores 78 and 88 are circular at each end but have a restricted center part 89 which is generally in the form of a slot for enabling longitudinal movement of the members 70 and 84 but will prevent lateral movement of such members.

The present invention generally is in the form of a modification and improvement over the device disclosed in copending application Serial No. 720,597, filed March 11, 1958, and represents an improved construction for holding a large number of workpieces precisely and accurately in a true line so that various accurate milling, grinding or shaping operations may be performed with each workpiece being an exact duplicate of all of the pieces. This is accomplished by providing a fixture with jaws that contact each piece individually to assure firm holding of every piece and also to ensure that all pieces are brought into contact with the fixed jaw or with another workpiece whereby all of the workpieces will be rigidly and securely retained in rigid relation to each other and rigid in relation to the fixed and movable jaws.

This device will accomplish rigid clamping engagement with the workpieces even though the pieces may vary somewhat in width or thickness by employing the compensating jaw assembly in which the movable jaws are disposed between retainer plates which slide on said rail members for clamping the work.

One of the most important features of the invention is the provision of compensating jaws which deliver direct line pressure to the workpieces with the jaws being relatively movable in relation to each other and easily removed for replacement by other jaws without removing the fixture. One of the salient features of the invention is that the clamping force is transmitted between the elements of the gripping jaw directly against each other rather than through mounting pins or the like for the force transmitting members. This enables all compressive force to be exerted on the members which define the compensating jaw assembly and does not limit the application of pressure except as to the compressive strength of these elements which, of course, is quite high. This results in considerable saving in manufacturing cost and also a considerable saving in assembly time and repair cost.

While the improved universal compensating jaw assembly and side locking device have been illustrated in an open gang fixture type frame which enables expeditious holding of long workpieces without limit and also for eliminating chips and the like, it is also within the purview of the present invention to include this construction in a vise type frame for gripping irregular objects and for side entry.

The components which form the compensating jaw assembly are not housed within each other thus requiring no special machining operation and these elements are also not fixedly attached to their mounting plates whereby the clamping force is transmitted from surface to surface of the elements which form the compensating jaw.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A work holding fixture comprising a framework including parallel side members with end members rigidly connecting the side members, one of said end members including a stationary jaw, the other of said end members including a screw threaded bore extending therethrough, an elongated threaded rod received in the bore for longitudinal movement in relation to the frame upon rotation thereof, a movable jaw assembly disposed within the open frame and including spaced parallel upper and lower plate members, the ends of the plate members overlying and sandwiching the side members for movement towards and away from the stationary jaw, and means interconnecting the movable jaw assembly and the threaded rod for movement of the movable jaw assembly upon rotation of the threaded rod, said movable jaw assembly including a layer of work gripping jaw elements and plural layers of force transmitting elements arranged pyramidally upon the layer of jaw elements, said layer of work gripping jaw elements including a plurality of compensating work jaws slidably disposed between the upper and lower plate members and slidably engaged with each other, said layers of force transmitting elements including a plurality of partial cylindrical members disposed in side-by-side relation between the plate members, said partial cylindrical members being greater than one-half of a cylinder with the flat surface thereof engaging the inner ends of the work jaws, and a plurality of pairs of substantially semi-cylindrical members engaged in sequential relation to each other and engaged with each other, the partial cylindrical members and substantially semi-cylindrical members transmitting compressive force to the work jaws and enabling the work jaws to move in relation to each other for engagement with a plurality of workpieces for retaining the workpieces clamped between the movable jaw assembly and the stationary jaw, a pair of bridging members engaging the two pair of semi-cylindrical members disposed nearest the threaded rod, and a transverse block engaging the bridging members and being connected to said threaded rod.

2. A work holding fixture comprising a framework including parallel side members with end members rigidly connecting the side members, one of said end members including a stationary jaw, the other of said end members including a screw threaded bore extending therethrough, an elongated threaded rod received in the bore for longitudinal movement in relation to the frame upon rotation thereof, a movable jaw assembly disposed within the open frame and including spaced parallel upper and lower plate members, the ends of the plate members overlying and sandwiching the side members for movement towards and away from the stationary jaw, and means interconnecting the movable jaw assembly and the threaded rod for movement of the movable jaw assembly upon rotation of the threaded rod, said movable jaw assembly including a layer of work gripping jaw elements and plural layers of force transmitting elements arranged pyramidally upon the layer of jaw elements, said layer of work gripping jaw elements including a plurality of compensating work jaws slidably disposed between the upper and lower plate members and slidably engaged with each other, said layers of force transmitting elements including a plurality of partial cylindrical members disposed in side-by-side relation between the plate members, said partial cylindrical members being greater than one-half of a cylinder with the flat surface thereof engaging the inner ends of the work jaws, and a plurality of pairs of substantially semi-cylindrical members engaged in sequential relation to each other and engaged with each other, the partial cylindrical members and substantially semi-cylindrical members transmitting compressive force to the work jaws and enabling the work jaws to move in relation to each other for engagement with a plurality of workpieces for retaining the workpieces clamped between the movable jaw assembly and the stationary jaw, a pair of bridging members engaging the two pair of semi-cylindrical members disposed nearest the threaded rod, and a transverse block engaging the bridging members and being connected to said threaded rod, a side lock mechanism including a plurality of pins movably mounted in one of the side members for engagement with the workpieces, and cam operated means mounted on the side member and engaged with the pins for exerting lateral force on the workpieces thereby retaining the workpieces in regular alignment with each other for engagement by a machine tool or the like.

3. The structure as defined in claim 2 wherein said cam operated means includes a bridging pressure member, a lever having the central portion thereof pivotally mounted on the side member, one end of the lever having the bridging pressure member thereon for exerting pressure on the pins, and a cam pivotally mounted on the other end of the lever and engaged with the side member for urging the lever about its pivotal mount for exerting pressure on the pins.

4. The structure as defined in claim 3 wherein certain of said pairs of semi-cylindrical members are pivotally and movably retained between the upper and lower plate members, other of the pairs of semi-cylindrical members and the partial cylindrical members being freely movable, the space between the upper and lower plate members adapted to receive lubricant for lubricating the movable parts and excluding foreign material from between the plate members, said lower plate member having a lubricant fitting extended therethrough.

5. A gang fixture for rigidly gripping a plurality of workpieces comprising a rigid frame having a stationary jaw fixed thereto, a movable compensating jaw assembly slidably carried by said frame for movement towards and away from said stationary jaw, interconnecting means between said frame and the movable jaw assembly for effecting movement of the movable jaw assembly in relation to said frame and said stationary jaw, said movable jaw assembly including a plurality of transversely arranged rows of force transmitting elements, a row of transversely arranged jaw elements for engaging a plurality of workpieces, a single transverse force transmitting element joined with said interconnecting means, a pair of retainer plates retaining the jaw elements and force transmitting elements in position with the jaw elements being slidable between said plates and the force transmitting elements being slidable between said plates for engagement with a series of workpieces having various center to center relationships for applying equal clamping pressure to each such workpiece, said force transmitting elements including a partial cylindrical surface and a partial flat surface with the flat surfaces of one row of force transmitting elements engaging the cylindrical surfaces of an adjacent row of force transmitting elments, the forces transmitting elments being freely rotatable to permit shifting movement thereof to compensate for variations in the positions of the movable jaws.

6. In a device for securely gripping a plurality of workpieces having a frame and a stationary jaw, that improvement comprising a movable compensating jaw comprising a plurality of transversely arranged rows of force transmitting elements, a row of jaw elements for engaging a plurality of workpieces, a pair of spaced parallel plates receiving the force transmitting elements and the jaw elements therebetween with the jaw elements projecting beyond the plates for engagement with the workpieces, said jaw elements and force transmitting elments being longitudinally movable between said plates for exerting clamping force onto the workpieces, said force transmitting elements being rotatable and including a cylindrical surface and a flat surface for transmitting force, through line contact between the elements of adjacent rows to the jaw member.

7. The structure as defined in claim 6 wherein each jaw element is provided with a longitudinally extending slot formed therein, a transverse retaining member extending through the slot for preventing movement of the jaw elements outwardly from between the plates, the rows of force transmitting elements increasing in size from the jaw elements towards the other end of the movable jaw assembly with the force transmitting elements in the rows adjacent the jaw elements being freely movable in relation to the plates but arranged in contact with each other, the rows of force transmitting elements remote from the jaw elements being spaced from each other and connected with the plates by a pin and slot connection with the slot being disposed in the force transmitting elements for providing movement thereof in relation to the plates.

8. A work holding fixture comprising a framework, a stationary jaw mounted on the framework, a movable jaw assembly mounted on the framework for movement toward and away from the stationary jaw, means on the jaw assembly slidably engaged with the framework for guiding the jaw assembly, means interconnecting the jaw assembly and the framework for moving the jaw assembly in relation to the framework, said movable jaw assembly comprising a frame, a layer of work gripping jaws and plural layers of force transmitting elements arranged pyramidally upon the layer of work gripping jaws, said layer of work gripping jaws including a plurality of elongated jaws arranged in side-by-side relation and slidable in relation to each other and in relation to the frame of the jaw assembly, said layers of force transmitting elements including a plurality of layers of members each having a partial cylindrical surface and a flat surface, said force transmitting elements being movably mounted on the jaw assembly and sequentially engaging each other for transmitting compressive force to the work jaws, and a side lock mechanism mounted on said framework and including means for engaging workpieces and clamping them laterally of clamping force exerted by the work-gripping jaws.

References Cited in the file of this patent

UNITED STATES PATENTS

| | | |
|---|---|---|
| 1,059,545 | Kunze | Apr. 22, 1913 |
| 1,499,989 | Lehmann | July 1, 1924 |
| 2,485,623 | McNairy | Oct. 25, 1949 |
| 2,486,494 | Rice | Nov. 1, 1949 |
| 2,658,415 | Barowsky | Nov. 10, 1953 |

FOREIGN PATENTS

| | | |
|---|---|---|
| 471,674 | France | Nov. 6, 1914 |
| 76,279 | Austria | Apr. 15, 1918 |
| 315,925 | Germany | Nov. 15, 1919 |
| 96,213 | Switzerland | Sept. 16, 1922 |